INVENTOR.
ROBERT LEHMKUHL
ATTORNEY

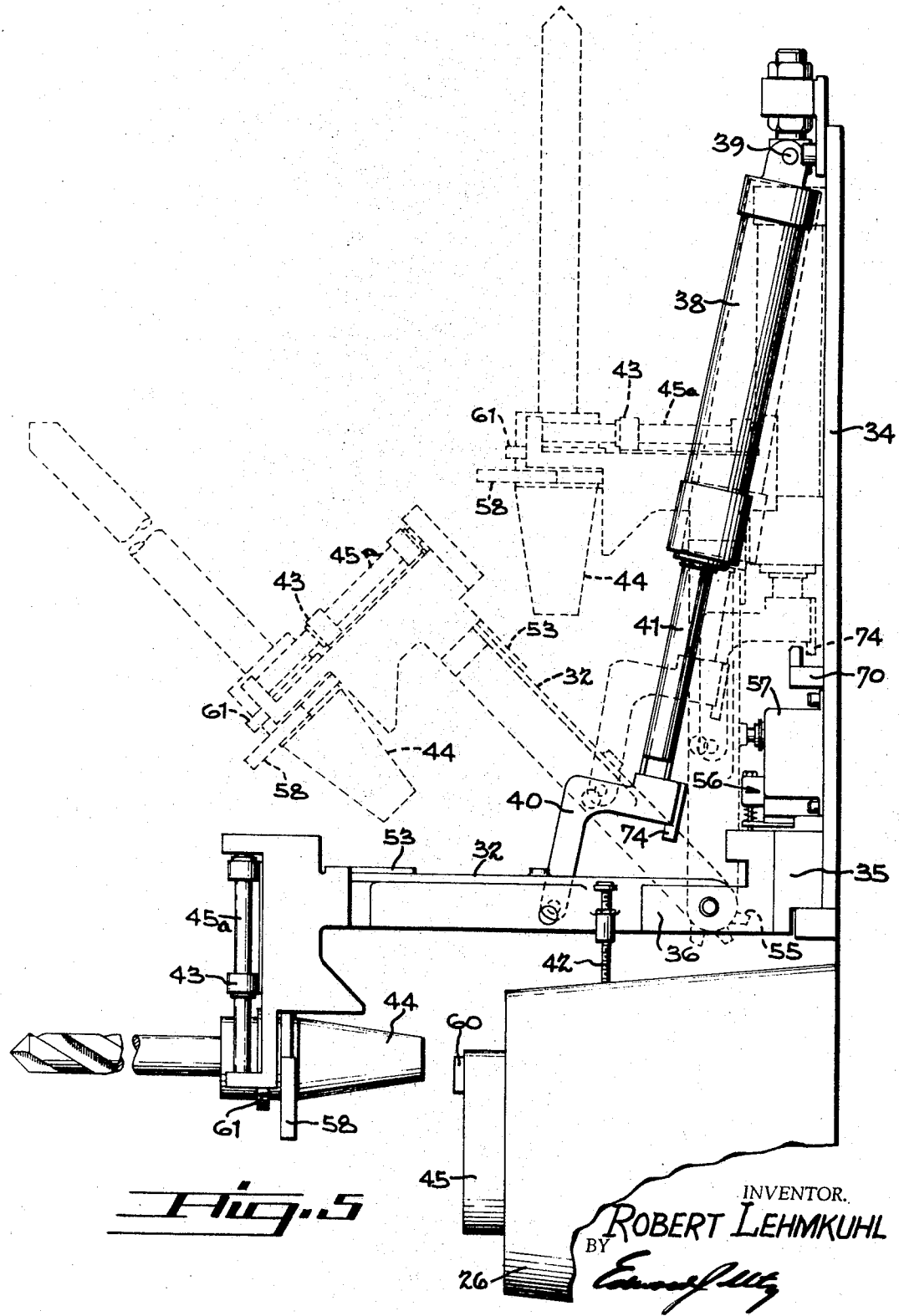

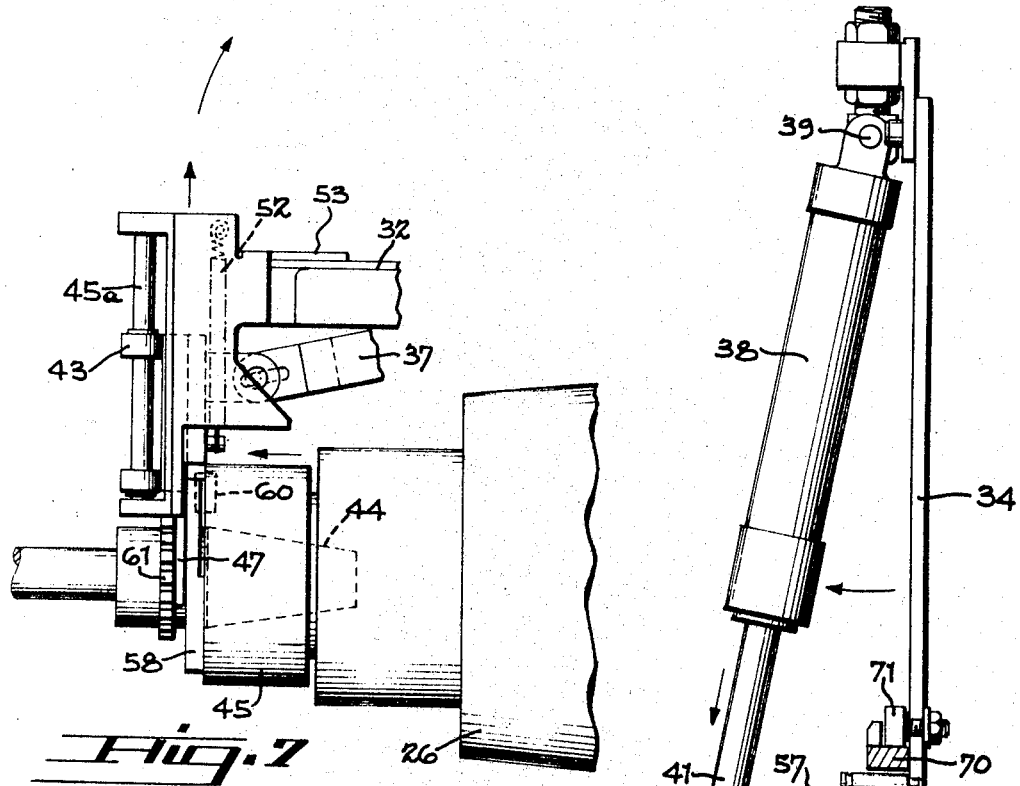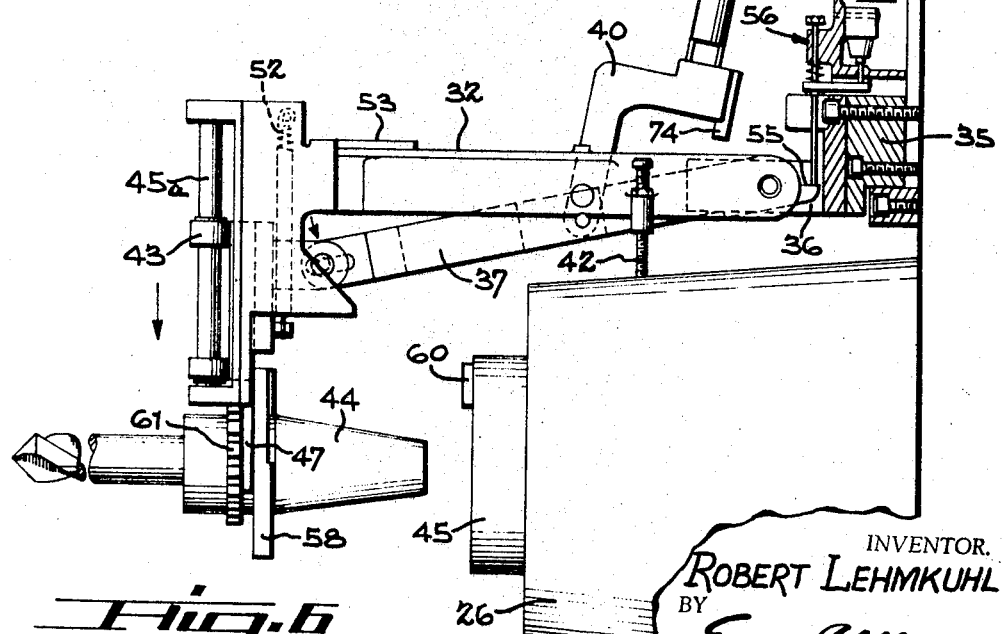

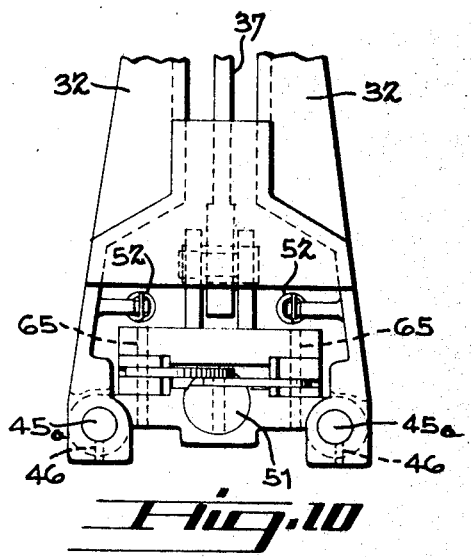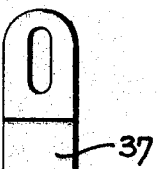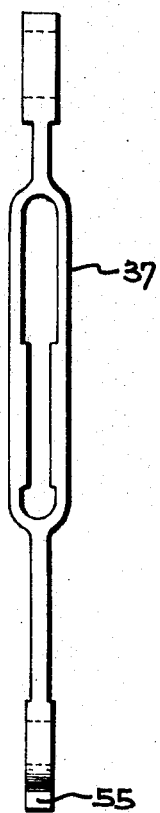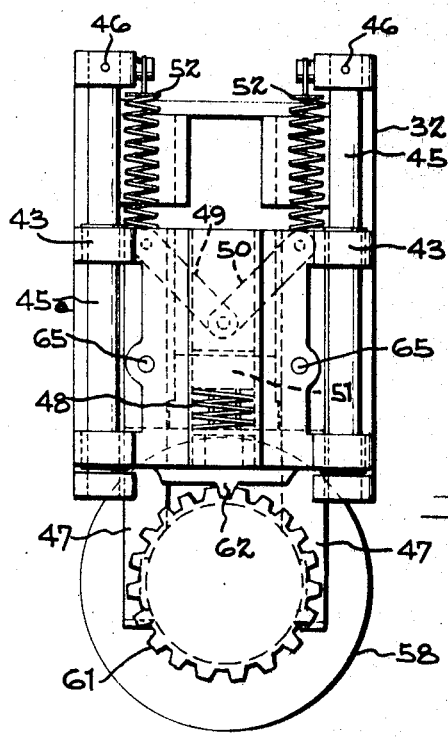

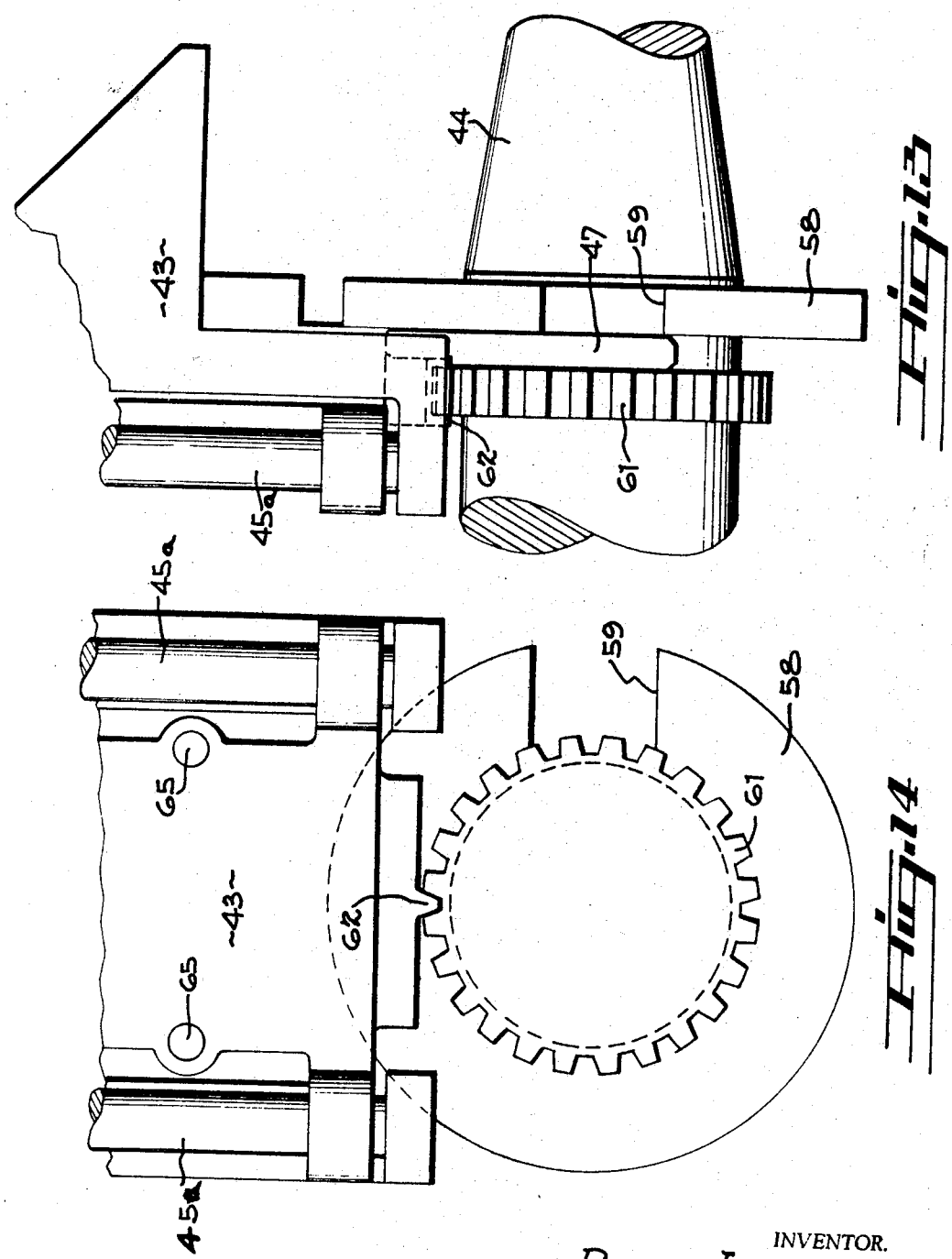

United States Patent Office 3,451,125
Patented June 24, 1969

3,451,125
AUTOMATIC TOOL CHANGER
Robert Lehmkuhl, Cincinnati, Ohio, assignor to The Carlton Machine Tool Company, Cincinnati, Ohio, a corporation of Ohio
Filed Sept. 18, 1967, Ser. No. 674,042
Int. Cl. B23q 1/08, 3/157
U.S. Cl. 29—568   12 Claims

ABSTRACT OF THE DISCLOSURE

A machine tool having a plurality of rotary cutting tools, each of which is carried by an arm, and the arm and tool are movable individually from a storage position and are engaged with the spindle by movement of the spindle to an operable position to unite with the tool.

---

My invention relates generally to machine tools and more particularly to machine tools equipped with a plurality of cutting tools of different types that may be made operative for performing a variety of machining operations.

The principal object of my invention is to provide a machine tool having a plurality of rotary cutting tools each of which is carried by an arm and the arm and tool are movable individually from a storage position and which require the movement of a spindle to an operable position to unite with the tool to make the tool operable.

Another object of my invention is to provide a machine tool having a plurality of movable arms each of which releasably secure a particular cutting tool and which cutting tool is adapted by movement of the arms to be connected to a spindle for presentation to a cutting position.

Still aonther object of my invention is the provision of a plurality of non-rotatable arms connected in a fixed plane on the machine.

Another object of my invention is the provision of a machine tool having a plurality of tools each of which is releasably secured to its particular arm mechanism when the tool is in its rest position.

Another object of my invention is the provision of a machine tool whereby any of the cutting tools which are releasably secured to a particular arm in a rest position lie in a plane at right angles to the cutting tool. This provides for non-interference of the operating cutting tool with respect to the work piece.

Another object of my invention is to provide a machine tool whereby the machine itself including the spindle and its rigid supporting members is brought within close proximity of the work piece for the cutting operation.

Another object of my invention is to provide a machine tool which has a column movable in a horizontal direction and which column is provided with a saddle, which saddle may be moved vertically to rapidly present a variety of tools at various cutting positions.

The saddle is provided with a head and spindle supporting mechanism which is slidable with reference to the saddle.

A further object of my invention is to provide a spindle supporting mechanism whereby the head and spindle supporting member move as a unit.

A further object of my invention is to provide a spindle supporting mechanism whereby the head and spindle supporting member move as a unit.

A further object of my invention is the provision of a machine tool having a pair of individually rotatable tables mounted adjacent to each other in a fixed position with reference to the base of the machine on which the column is slidable.

Another object of my invention is the provision of individually rotatable tables mounted in a fixed position, one of which may be loaded with work pieces upon which the machining operation can be performed while the other is free for loading or unloading products. The tables are so positioned with reference to the machining structure of the device that large work pieces may be secured on both tables and machining operations carried on on one work piece which may straddle both tables.

Another object of my invention is the provision of a machine tool having a saddle with a head and spindle member movable within or relative to said saddle, said saddle having secured to it hydraulically operated arms for releasably securing cutting tools.

Another object of my invention is to provide for the pivoting of two arms through hydraulic means to releasably secure a cutting tool and means for releasing the said cutting tool from said arms for connection with the spindle.

Another object of my invention is the provision for actuating the cutting tool from its position adjacent the saddle and its subsequent connection with the spindle by means of the same hydraulic devices.

Another object of my invention is the provision of a device operating in a vertical plane and having gripping members to grip a cutting tool, and means for operating these gripping devices hydraulically, by utilization of an arm member, said second arm traveling at right angles to the spindle center line, the outer arm remaining parallel to the spindle center line while the inner arm travels beyond said parallel line.

Another object of my invention is the provision of an inner arm which in its travel towards the spindle center line advances the tool holding slide in a true straight line path at right angles to the center line of the spindle.

Another object of my invention is to provide a safety device whereby the tool arms are locked in the retracted and non-operable position in the event of a power failure or machine shutdown.

Another object of my invention is the provision of an orientation retention device whereby the tool is removed from the spindle in one position and presented back to the spindle in exactly the same position.

Another object of my invention is the provision of a machine tool having tools with a tool shank having an orientation retention device secured to said tool shank to cooperate with the arms for holding the tools.

Another object of my invention is the provision of an automatic device whereby the spindle is signaled when the tool is in position to be engaged by the spindle after the spindle is signaled to move to an extended position.

Another object of my invention is the provision of an automatic device which signals the spindle when the arm has been retracted which permits the spindle to engage the tool in cutting action.

Another object of my invention is the provision of stop screws on the outer arm of the arm tool positioning mechanism which when adjusted can allow deliberate deflection of the outer arm providing a means to align the center line of the tool with the center line of the spindle. This action takes place in a plane parallel to the tool slide plane on that particular arm.

Another object of my invention is the provision of an adjustable pivot point located on the hydraulic mechanism which fixes the cutting tool in a previously selected fixed position with reference to the spindle.

Another object of my invention is the provision for identifying each of the tools by number and connecting them with the dialing mechanism whereby switches are operable to actuate any particular arm among the plurality of arms which are mounted on the saddle to cause the tool in response to a particular setting on the dial to be moved to its operating position or in the alternative to be removed from its operating position from the spindle.

Another object of my invention is the provision of means for adjusting the screws on the outer arm to insure that the movement of the tool slide is at a right angle to the center line of the spindle.

Another object of my invention is to provide a machine tool having a mechanical cutting tool changer, the machine being capable of automatic operation and having hydraulic and electrical interlocks that serve to control its operation in the event of malfunctioning for the purpose of preventing damage to the machine, the cutting tools, the work piece, and the worker.

In general my invention comprises an improved machine tool having a bedplate on which a movable horizontal saddle is supported. I secure a column to the horizontal saddle, the column being provided with a vertical screw which carries a second saddle which carries the head, which is provided with a spindle member. The column, saddle, and head and spindle members are mounted relative to fixed tables fastened adjacent to the bedplates to permit work pieces on said tables to be mounted so that the spindle may perform cutting operations on said work pieces.

In order to provide for automatic work operations on said work pieces, I have provided a plurality of arms pivotally secured to the saddle which is mounted on the column. Each of the arms is adapted to secure and hold at one of their ends a tool for cutting operations. Each of the arms is adapted to be moved into position whereby the tool is engageable with the spindle and then the arms are removed from the tool and returned to their retracted or idle position whereupon the cutting tool is engaged with the spindle and is in position to perform its work.

The arms pivotally mounted to the saddle are in fixed relation to the spindle and to the machine and any one of the plurality of arms may be selected by means of tape control or manipulation of manual switches to position the arms to position the tool to be engaged in the spindle, or to be removed from the spindle after the work operation has been performed.

In a machine tool such as I have described in my invention, I accomplish the feeding of the tool into the work piece by first positioning the cutting tool in the spindle and then advancing the spindle to a previously programmed position and then feeding the head with the spindle in its previously located position into the work piece.

In my invention I provide six discrete positions for the spindle in its relation with the head member. The spindle is extended to a discrete position wherein it engages the cutting tool and then may be positioned to one of four suspended discrete positions or retracted to another discrete position and then the head and spindle as a unit are fed into the work piece.

In my invention I also provide for surface sensing such as is known in the art and described in Patent No. 3,302,492. In that patent for use with random length tools which are not pre-programmed the spindle is extended until the tool touches the work pieces whereupon the spindle is automatically clamped within the head and then the head and spindle together are fed into the work.

In the drawings the same reference numerals refer to the same or similar parts throughout the several views, and the sectional views, are taken looking in the direction of the arrows at the end of the section lines.

FIGURE 5 is a view of the tool arm mechanism showing the tool in position prior to being located within the spindle at the end of the tool outer arm movement.

FIGURE 6 is a view of the tool arm mechanism showing the tool after it has been positioned on a center line with the spindle and prior to movement of the spindle to engagement with the tool shank.

FIGURE 7 is a view of the tool slide mechanism and spindle showing the position of the tool arm and tool slide at a point prior to the retraction of the tool arms into position adjacent to the saddle, leaving the tool in engagement with the spindle.

FIGURE 9 is a detailed view of the slide mechanism and the gripping device.

FIGURE 10 is a view in plan elevation of the structures shown in FIGURE 9.

FIGURE 11 is a detailed view of the inner arm of the tool operating mechanism.

FIGURE 12 is a view in side elevation of the structure shown in FIGURE 11.

FIGURE 13 is a view in side elevation of the tool orientation retention device showing the tool shank configuration for meeting with the tool gripping fingers.

FIGURE 14 is a view in plan elevation of the structure shown in FIGURE 13.

Figure 1:
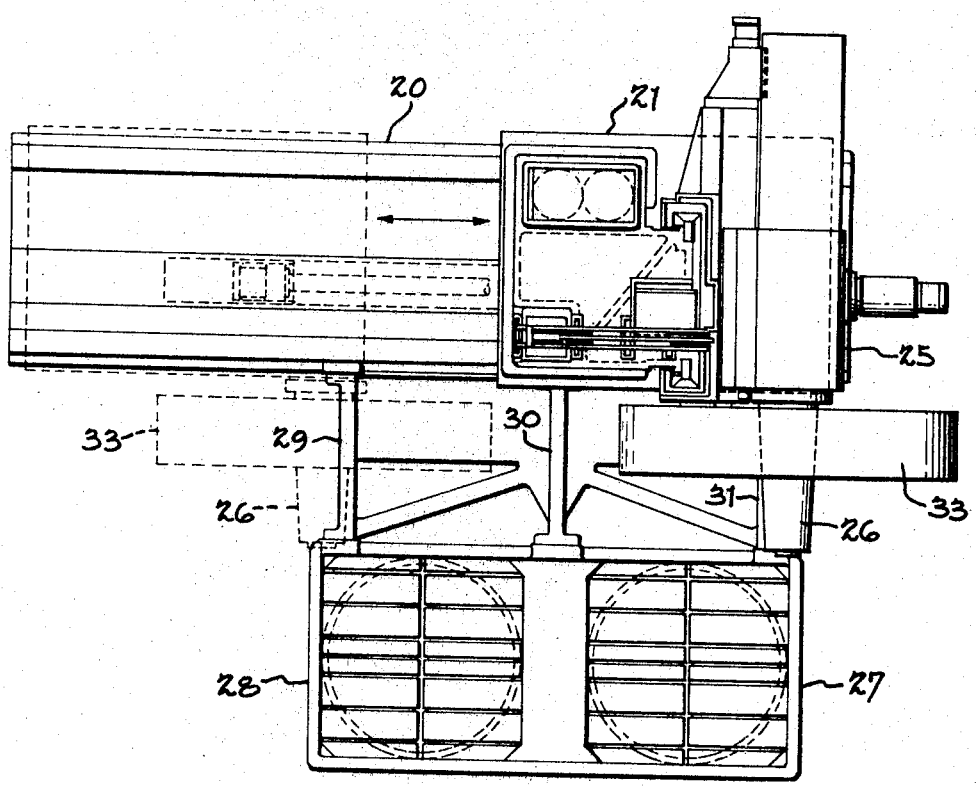
FIGURE 1 is a plan view of the machine tool.
Figure 2:
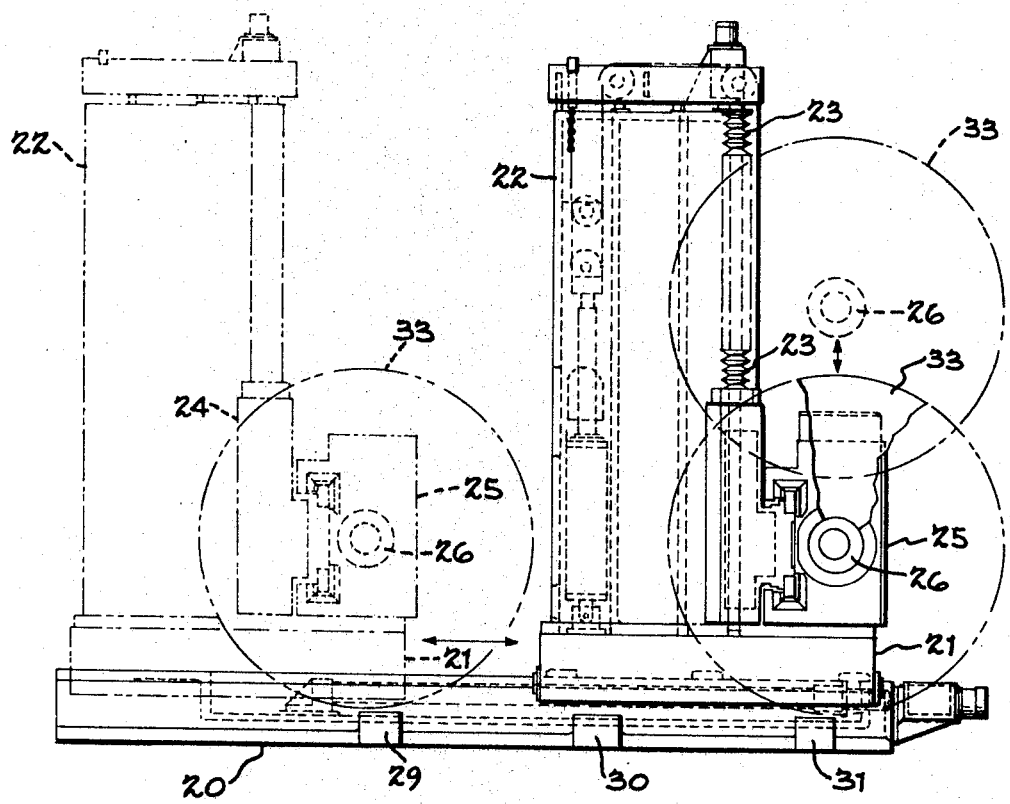
FIGURE 2 is a view in side elevation of the structure shown in FIGURE 1.
Figure 3:
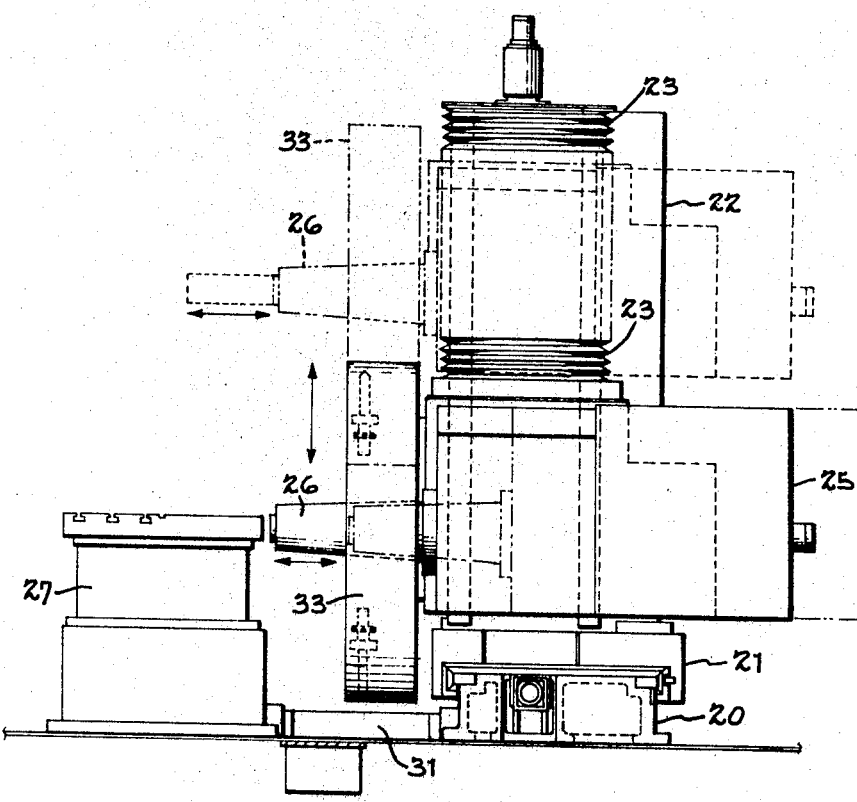
FIGURE 3 is a view showing the saddle, the spindle support housing, and the spindle, and in dotted lines I show the position in which the head and spindle mechanism may be moved.

Referring to the drawings, I show in FIGURE 1, a bedplate 20, which supports a horizontal saddle 21, movable along said bedplate 20. Secured to the horizontal saddle 21 is a column 22 provided with a vertical screw 23, which carries a vertical saddle 24, which has a head 25, carrying a spindle 26. The column 22, vertical saddle 24, head 25 and spindle member 26, are mounted relative to a pair of fixed tables 27 and 28, which are secured to the bedplate 20 by means of bracket members such as 29, 30 and 31. In order to provide for automatic work operations on work pieces which are secured to the tables, I have provided a plurality of arms, such as arm 32. Arm 32 is pivotally secured to the saddle 25, mounted on the column 22. The arms pivot parallel to the spindle 26 and any one of the plurality of arms is selected by means of tape control or by manipulation of manual switches. Each arm 32 of my invention is used as a separate storage means for an individual tool.

Figure 4:
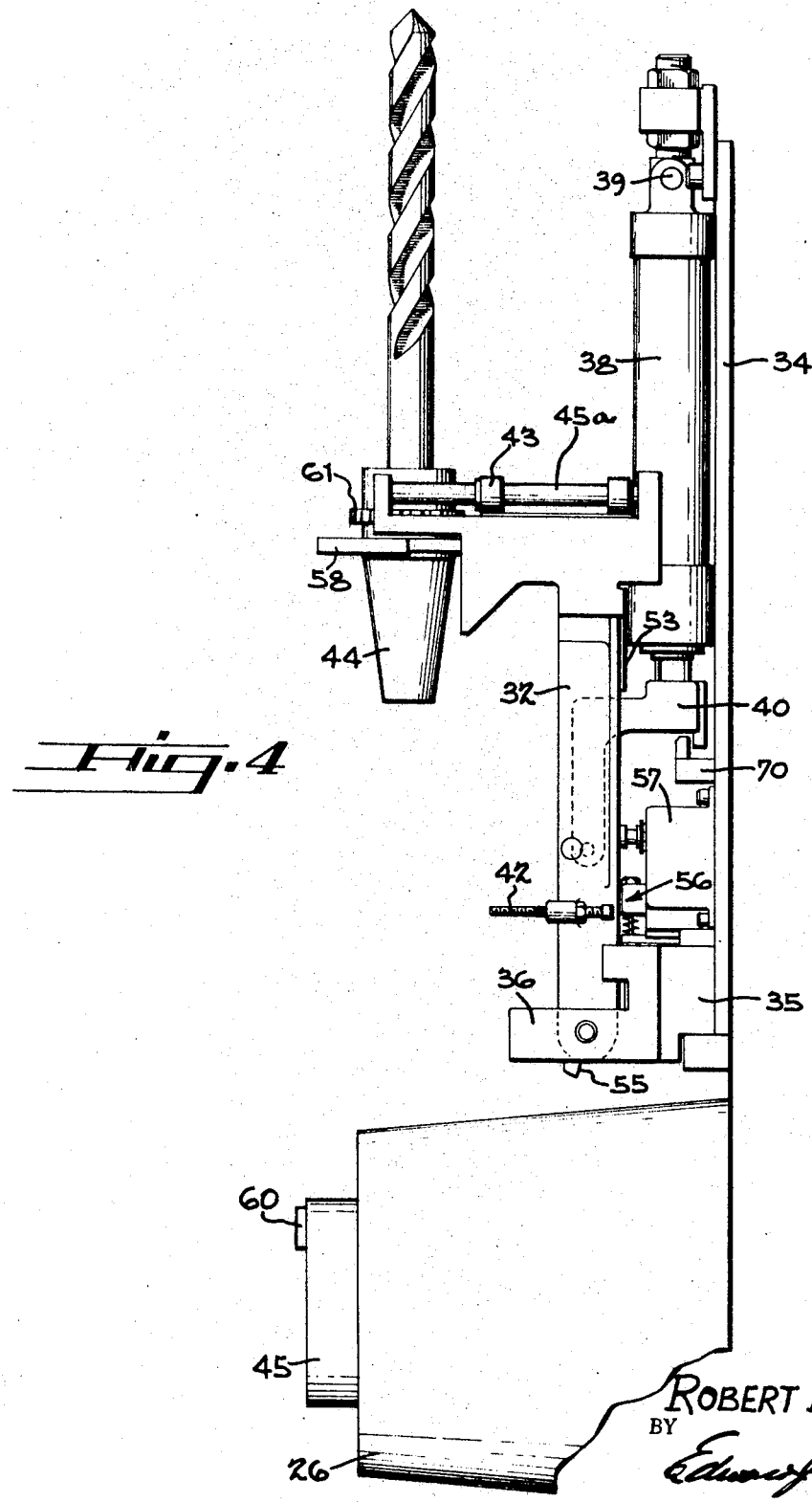
FIGURE 4 is a view of the tool arm mechanism showing the tool in its retracted position.
Figure 8:
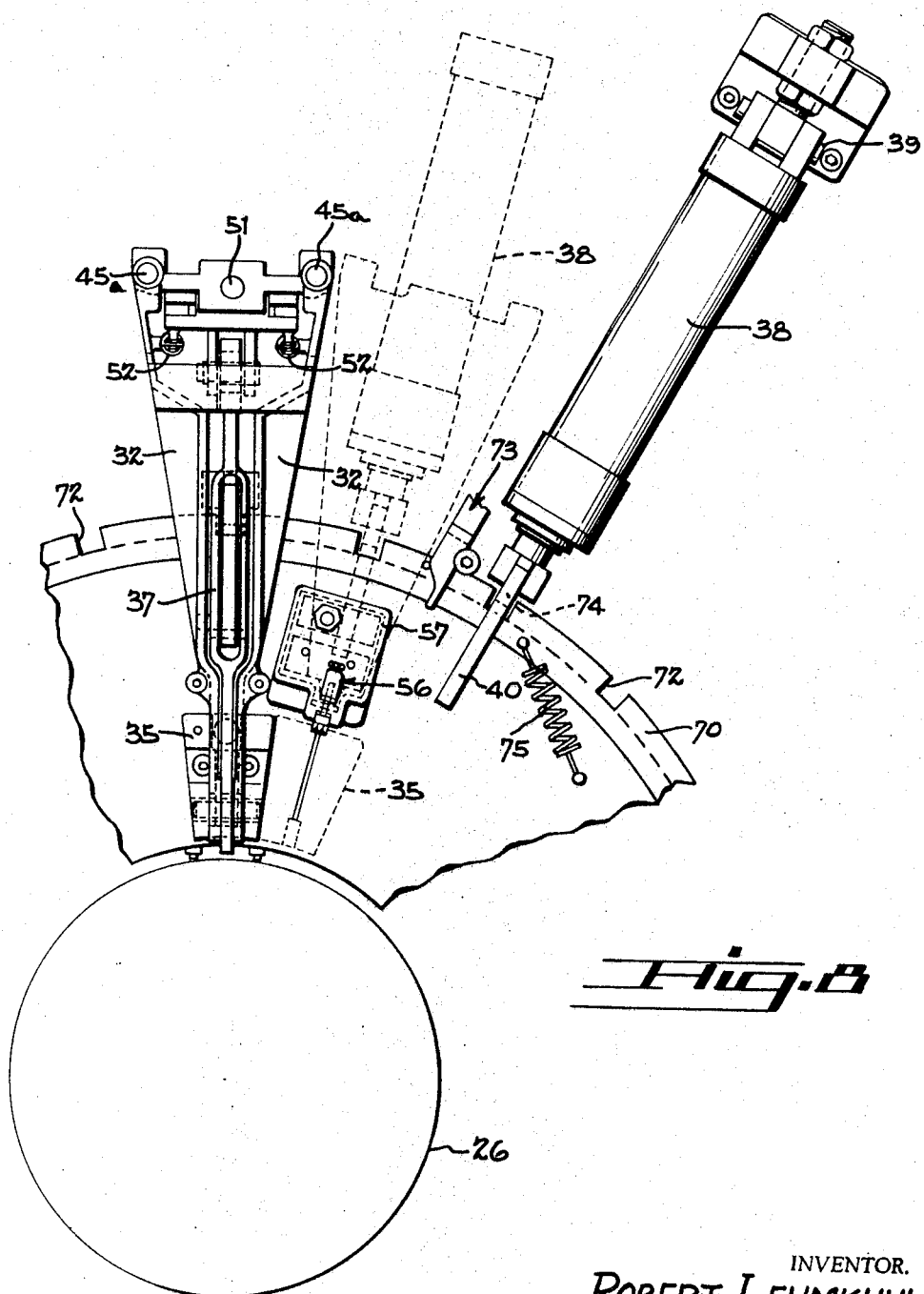
FIGURE 8 is a partial, detailed view of the tool structure showing the lock ring for holding the hydraulic mechanism along with the operating arm in retracted position.

I provide at 33 a tool change mounting bracket (FIGURE 4) which contains a plate 34 to which is secured a centering ring 35. The pivot blocks 36 are secured to the centering ring 35, about which the arms 32 pivot. I pivot the arm 32 into a preliminary work position by means of a hydraulic cylinder 38 pivoted at its one end at 39 to a pivot block which is secured to the mounting plate 34. The other end of the cylinder 38 has a yoke 40 connected to it which connects with the inner arm 37. The movement of the yoke against the inner arm 37 in effect pivots the arm 32 about pivot block 36 in its initial movement. After the arm 32 has reached a position at the end of its stroke determined by means of a stop screw 42 further movement of the piston 41 in the hydraulic cylinder 38 causes the inner arm to be deflected at a further angle and to move the tool carriage 43 in a straight line whereby the shank 44 of the tool is in position to be received by the spindle 45.

The arm 32 is provided with a yoke having ways which support the tool carriage bars 45. Fingers 47 which are slidable within the carriage mechanism are pivoted within the tool carriage. A spring 48 is seated in the counter bore of the tool carriage 43 and a pair of arms 49 and 50 are pivoted to a spring block 51 which has a spring 48 having a plunger about which the lever arms pivot. When the hydraulic cylinder piston 41 is caused to be retracted the inner arm 37 moves the tool carriage 43 in a straight line as a result of spring 52 acting on the tool carriage 43 to bring the inner arm 37 in line with the outer arm 32.

Continued movement of the piston 41 causes the entire lever arm with the tool to be retracted to its storage position. The arm 32 is provided at its outer end with a stop 53 which serves as an abutment for inner arm 37. When inner arm 37 strikes the stop 53, continued movement of the piston 41 causes the entire mechanism to retract into its storage position. A switch actuating cam 55 is provided on the inner arm 37 which acts in conjunction with the limit switch indicated generally at 56 which cooperates with the inner lock mechanism to permit the spindle to move to receive the tool in its working position. An additional limit switch 57 cooperates with inner lock limit switch 56 previously described which signals when the arm has been completely retracted and permits the spindle to perform its working operation.

The machine of this invention is provided with an electro-hydraulic servo-mechanism (not shown) which insures that the spindle will always stop in the same position. I provide a tool shank in the operation of this machine indicated at 44, which has a flange 58, which is provided with a slot 59. The driving key 60 on the end of the spindle engages within the slot 59 of the flange 58. The tool shank 44 is provided with a tool-orientation-retention flange 61 which is integral with the tool shank 44 and is positioned adjacent to the integral flange 58. The retainer 61 is provided with a series of spaced openings which may be in the form of gear teeth or may be provided with some other suitable means adapted to receive a projection 62 which is secured to the end of the tool carriage 43. Initially, the tool is placed in the spindle and subsequently the device just described insures the placement of the tool in the storage arm in one position. The tool is placed in the spindle in one position by engagement of the key arrangement and the retention device just described insures that the tool will retain a fixed position in the storage mechanism and always be returned in the same position in which it was placed originally. The tool is secured to the arm such as 32 through the fingers provided at 47 (FIGURE 9) which pivots about pins, such as pin 65, so that the lead edge of the finger such as 47, when it is in position to grip the tool shank pivots about pin 65, and upon continued movement, returns to its original position to hold the tool shank in place. In order to release the tools from their storage position, it is necessary that a ring member 70, having a series of notches 72, and cooperating with a cam roller, such as 71, be indexed to a position to permit the yoke to be released from behind the ring. In the event of a power failure, the indexing is accomplished by means of a plunger, indicated generally at 73, to which is secured a spring which will normally hold the plunger in its retracted position, and operates against a spring 75, secured to the plate 34 and to the ring 70, and which tends to hold it out of alignment to hold it and its opening 72 out of alignment with the projection 74 secured to the yoke 40.

Having thus described my invention what I claim as new and useful and desire to secure by United States Letters Patent is:

1. A machine tool having a bedplate, a horizontal saddle movable along said bedplate, a column secured to said horizontal saddle, a vertical saddle secured to said column, a head secured to said vertical saddle, a spindle in said head, a non-rotatable mounting plate secured to said saddle, a plurality of arms pivotally secured on said mounting plate in fixed relation to said spindle, each of said arms adapted to carry a tool, and each of said arms selectively operable to place a tool in position for engagement in said spindle and a source of power connected to said spindle for moving said spindle axially for engagement with said selected tool.

2. A machine tool having a bedplate, a horizontal saddle movable along said bedplate, a column secured to said horizontal saddle, a vertical saddle secured to said vertical column, a screw for moving said vertical saddle relative to said column, a head secured to said vertical saddle, a tool-carrying spindle carried in said head, a mounting plate, a plurality of tool-carrying arms pivotedly secured to said mounting plate, said mounting plate secured to said saddle, each of said arms adapted to carry a tool from a storage position to a position of engagement with said spindle and a source of power connected to each of said arms to move said arm from a storage position to a position of engagement of a tool carried in the arm with the spindle and for returning said arm to said storage position after engagement of said tool with said spindle.

3. A machine tool having a head carrying member, a head affixed to said head carrying member, a spindle in said head, power means connected to said head to rotate said spindle and move said spindle relative to said head, a mounting plate secured to said head carrying member, a plurality of arms pivotedly secured to said mounting plate, each of said arms selectively operable to move independently to a position in front of said spindle, each of said arms provided with a pair of fingers for alternately gripping and releasing the tool carried in said arm for engagement or disengagement with the spindle carried in said head.

4. A machine tool having a bedplate, a horizontal saddle movable along said bedplate, a column secured to said horizontal saddle, a vertical saddle secured to said column, a head secured to said vertical saddle, a spindle in said head, a mounting plate secured to said saddle, a plurality of tool change arms carried by said mounting plate for movement for transferring tools into and out of said spindle, said head adapted for axial movement relative to said tool change arms, said tool change arms comprising a pair of members with a pair of fingers for transferring a tool to said spindle and for removing a tool from said spindle and for holding the tool when the arm is not in its extended position in a storage station, and a source of hydraulic power connected to each of said arms to drive said arm in an arc to an extended position then and said spindle axially movable to engage or disengage the tool with said spindle.

5. In a machine tool having a bedplate, a horizontal saddle movable along said bedplate, a column and screw secured to said horizontal saddle, a vertical saddle secured to said column and movable by operation of said screw, a head secured to said vertical saddle, a spindle in said head, the combination of a mounting plate secured to said vertical saddle in fixed relation to said spindle, a plurality of nonrotatable pivotable arms secured to said mounting plate, a source of electro-hydraulic power connected to each of said arms to move a selected arm through a transfer arc to a position relative to said spindle, a source of power connected to said spindle to engage said spindle with a tool carried in the selected pivoted arm and means for releasing said tool and returning said selected pivoted arm to its storage position, said tool being retained in said spindle.

6. In a tool positioning mechanism for positioning tools in the tool head of a machine tool; a non-rotatable mounting plate, a plurality of arms pivotally secured to said mounting plate, each of said arms translationally movable from said mounting plate, a pair of fingers for each of said arms adapted to secure a tool, each of said arms movable to an extended position and each of said pair of fingers adapted in its extended position to engage or disengage a tool with the spindle.

7. In a tool positioning mechanism for positioning tools in the spindle of a tool head of a machine tool; a non-rotatable mounting plate, a plurality of arms pivotally secured to said mounting plate, a hydraulic means for moving a selected one of said arms from said mounting plate into an extended transfer position in front of said spindle in said head, and for moving said spindle axially with relation to said head to couple a tool secured in said arm in said spindle in said head, and means for removing said arm from said tool after coupling of said tool with said spindle and returning said arm to its storage position.

8. In a tool positioning mechanism for positioning tools in the spindle of a tool head of a machine tool; a non-rotatable mounting plate, a plurality of arms pivotally fixed to a non-rotatable mounting plate, each of said arms independently rotatable through an arc to an extended position, power means for driving said arm through said arc to its extended position, said power means comprising a hydraulically operated cylinder connected to said arm, a piston in said cylinder extensible from said cylinder to drive said arm to a maximum extended position, and then to move said spindle axially relative to said arm in its extending position to engage the tool, a pair of fingers attached to said arm releasably securing a tool and means to release said tool at the end of the axial movement of said spindle to engage said tool with said spindle and means for removing said tool from said spindle.

9. The device as described in claim 8 wherein the fingers on the arm engage the tool while it is positioned in the spindle and lock the tool to the arm and move the spindle to withdraw the tool and return it to its non-operating position.

10. A machine tool having a bedplate, a horizontal saddle movable along said bedplate, a column secured to said horizontal saddle, a vertical saddle secured to said column, a head secured to said vertical saddle, a spindle in said head, a non-rotatable mounting plate secured to said saddle, a plurality of arms pivotally secured on said mounting plate in fixed relation to said spindle, each of said arms adapted to carry a tool, and each of said arms selectively operable to place a tool having a shank coaxially with said spindle and power means for moving said spindle to engage said tool shank, means for releasing said tool from said extended arm after engagement in said spindle, and means after the tool has performed its operation for extending a selected arm to a position coaxially with said tool in said spindle, means for causing said tool to be released from said spindle and fingers on said arm for securing said tool and returning it to its non-operative position.

11. The device in claim 10 wherein a single driving key is secured to the spindle for locating the tool when it is engaged in the spindle and for returning the tool to its original position in a selected arm when it is removed from the spindle.

12. The device of claim 10 wherein the tool is provided with a shank which has a flange to engage a driving key provided on the spindle, said flange being integral with the tool shank and having a series of notches to receive a projection secured to the tool carrying arm.

References Cited

UNITED STATES PATENTS 3,316,629   5/1967   Meyer _____ 29—568

RICHARD H. EANES, JR., *Primary Examiner.*